July 15, 1941.    F. P. NOFFSINGER    2,249,394
POTATO DIGGER
Filed Feb. 5, 1940
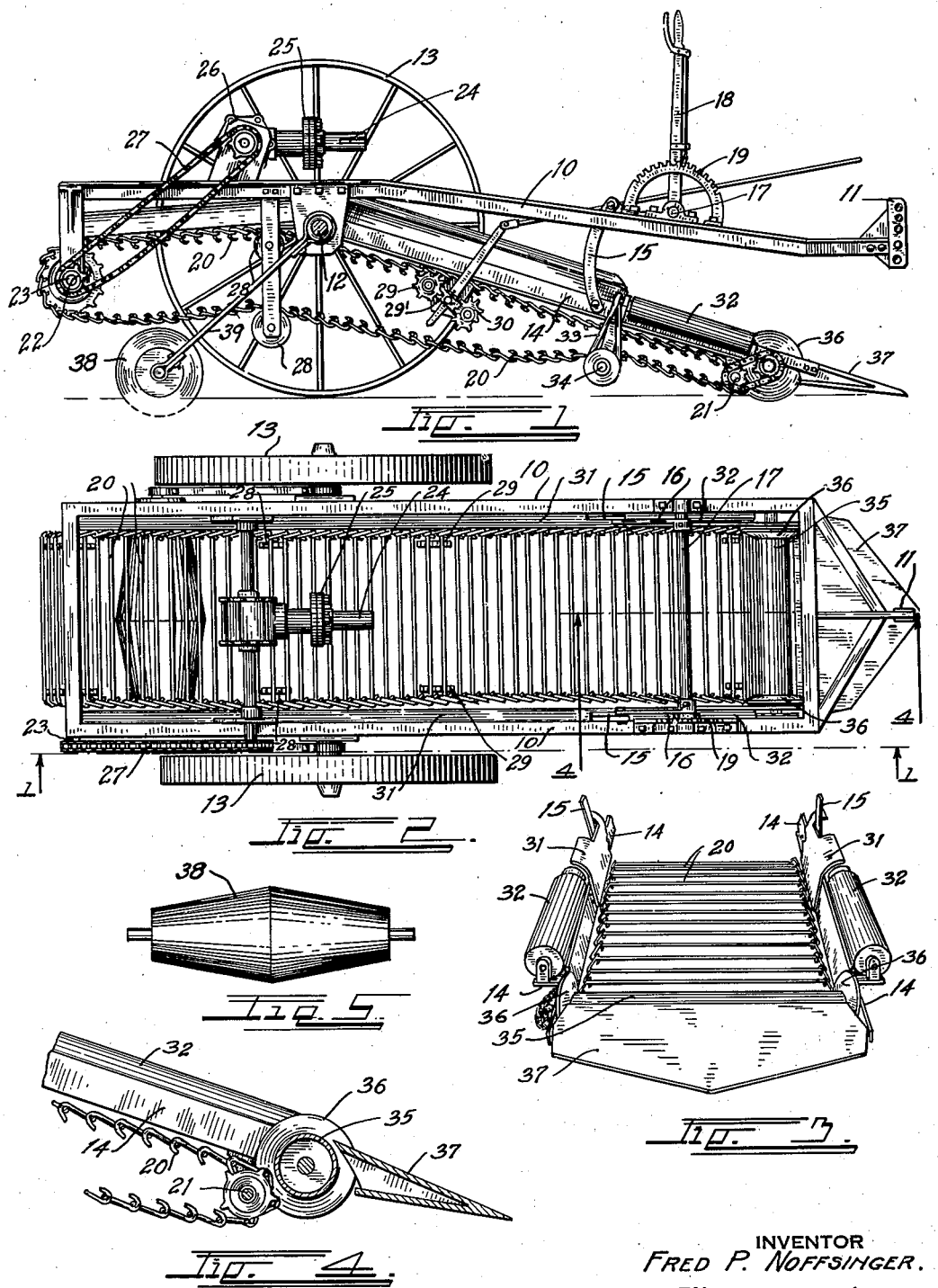
INVENTOR
FRED P. NOFFSINGER.
BY
ATTORNEY Patented July 15, 1941

2,249,394

UNITED STATES PATENT OFFICE 2,249,394

POTATO DIGGER

Fred P. Noffsinger, Greeley, Colo.

Application February 5, 1940, Serial No. 317,254

3 Claims. (Cl. 55—51)

This invention relates to a potato digger and has for its principal object the provision of a digger which will not bruise or damage the potatoes.

In the usual potato digger, the digging shovel brings the potatoes up against a revolving chain which lifts them from the shovel and transports them rearwardly. This chain travels at relatively high speed and, when it strikes the potatoes in an endeavor to lift them onto the chain, it breaks and bruises the jackets.

In this invention, the potatoes are not lifted by the revolving chain but are deposited on the chain in an earth cushion so that the damage to the potatoes usually occasioned by the chain bars is entirely eliminated.

Other objects of the invention are to provide means which will prevent the potato vines from catching, clogging, or dragging on the conveyor; and to provide means whereby the shaking mechanism of the elevating chain need not be used when not required to still further reduce potato damage.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a side elevation of the improved potato digger with the near wheel removed, taken on the line 1—1, Fig. 2.

Fig. 2 is a plan view of the potato digger with the invention embodied therein.

Fig. 3 is a fragmentary front view of the digging shovel.

Fig. 4 is an enlarged section, taken on the line 4—4, Fig. 2.

Fig. 5 is a detail view of the press roll for forming a receiving bed for the dug potatoes.

The improved digger employs a continuous fixed frame 10 extending forwardly and terminating in a suitable tractor hitch 11. The rear extremity of the frame 10 is carried on an axle 12 extending between ground engaging wheels 13. After the tractor hitch has been secured to the tractor in its desired position, the frame 10 is rigidly maintained in a fixed position.

A hinged conveyor frame 14 is pivoted on the axle 12 and extends forwardly therefrom. The front extremity of the conveyor frame is supported at each side on a link 15. The links 15 extend downwardly from levers 16, secured to a lever shaft 17 extending across the frame 10. A depth adjusting, hand lever 18 is secured to and extends upwardly from the lever shaft. This lever may be set in any desired position by means of a toothed sector 19.

An endless bar conveyor 20 is trained about sprockets on a sprocket shaft 21 at the forward extremity of the conveyor frame and about drive sprockets 22 on a rear sprocket shaft 23 supported from the fixed frame 10. The conveyor 20 may be driven in any desired manner. As illustrated, it is to be driven from the usual power take-off of a tractor, through the medium of a stub shaft 24, universal joint 25 and transmission 26. The transmission drives a transmission shaft which transmits power to the sprocket shaft 23 through the medium of a drive chain 27.

The conveyor is supported throughout its length upon suitable idler sprockets 28. The idler sprocket 29, beneath the elevating reach of the chain is mounted on a tilting lever 29', on the other extremity of which, is an eccentric sprocket 30. By tilting the lever 29', either the concentric sprocket 29 or the eccentric sprocket 30 can be brought beneath the chain. Should the digger be used in sandy soils where there are no clods to be removed from the potatoes, the concentric sprocket 29 is used. In cloddy soil, the eccentric sprocket 30 is used to vibrate the chain and shake the clods from the potatoes.

Throughout its length the conveyor frame is provided with hopper sides 31 at the forward extremity of each of which is a vine gathering roll 32. The gathering rolls 32 are driven by means of suitable belts 33 from the extremities of an idler sprocket shaft 34 so that they will rotate inwardly at their tops.

Positioned above and forward of the bottom extremity of the bar chain is a roller 35 having wide end flanges 36. This roller extends the full width of a conveyor frame and the end flanges thereof align with the hopper sides 31 of the conveyor.

Immediately ahead of the roller 35 is the usual digging shovel 37. It will be noted that the upper surface of the shovel 37 approaches the top of the roller 35 and that the roller 35 is above the lower extremity of the conveyor chain 20.

In use, the conveyor frame is lowered by means of the lever 18 until the shovel will pass below the potatoes in the ground. The potatoes and the surrounding soil are elevated by the shovel and passed onto the roller 35. The rearward movement of the roller passes them backwardly onto the conveyor chain in a cushion of earth so that they are not damaged in any way. The earth then falls back through the open bars of the chain leaving the potatoes thereon. Any potato vines which may be on the shovel are gathered by the rearwardly rotating flanges 36 on the roller. Exceedingly long or wide spread vines may pass rearwardly onto the gathering rolls 32 which will roll them inward onto the conveyor.

One of the principal features of this invention is that the potatoes after leaving the shovel do not strike the conveyor chain until they have been elevated above the chain so that they cannot be damaged by the bars traveling over the forward sprockets.

A relatively heavy press roll 38 is hingedly suspended from the axles of the wheels 13 by means of suitable draw bars 39 to roll a smooth bed for receiving the potatoes from the rear discharge extremity of the bar chain. This roller is enlarged at its middle in order to form a channel-like bed into which the potatoes are deposited and covered by the vines in order to protect them from the sun and weather.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. In a potato digger having a traveling bar chain and a shovel for digging the potatoes ahead of said chain, a roller; means for supporting said roller transversely of said chain between said shovel and the forward extremity of said chain and above the upper surface of the latter; an end flange at each extremity of said roller, said flanges being in substantial alignment with the side edges of said chain; and means for rotating said roller rearwardly.

2. In a potato digger having a traveling bar chain and a shovel for digging the potatoes ahead of said chain, a roller; means for supporting said roller transversely of said chain between said shovel and the forward extremity of said chain and above the upper surface of the latter; and a roller lying parallel to the axis of said chain at each side thereof, said latter rollers extending upwardly and rearwardly from the extremities of the first roller.

3. In a potato digger having a traveling bar chain and a shovel for digging the potatoes ahead of said chain, a roller; means for supporting said roller transversely of said chain between said shovel and the forward extremity of said chain and above the upper surface of the latter; a roller lying parallel to the axis of said chain at each side thereof, said latter rollers extending upwardly and rearwardly from the extremities of the first roller; and means for positively rotating all of said rollers so that their upper surfaces will move toward said chain.

FRED P. NOFFSINGER.